(12) United States Patent
Yasuda et al.

(10) Patent No.: US 7,879,490 B2
(45) Date of Patent: Feb. 1, 2011

(54) LEAD BATTERY AND LEAD BATTERY STORAGE METHOD

(75) Inventors: Hiroshi Yasuda, Aichi (JP); Tsunenori Yoshimura, Shizuoka (JP); Mitsuru Kurokawa, Osaka (JP); Sadao Furuya, Aichi (JP)

(73) Assignee: Panasonic Corporation, Osaka (JP)

( * ) Notice: Subject to any disclaimer, the term of this patent is extended or adjusted under 35 U.S.C. 154(b) by 1114 days.

(21) Appl. No.: 10/588,849

(22) PCT Filed: Mar. 17, 2005

(86) PCT No.: PCT/JP2005/004821

§ 371 (c)(1),
(2), (4) Date: Aug. 9, 2006

(87) PCT Pub. No.: WO2005/093890

PCT Pub. Date: Oct. 6, 2005

(65) Prior Publication Data

US 2007/0184349 A1 Aug. 9, 2007

(30) Foreign Application Priority Data

Mar. 26, 2004 (JP) ............... 2004-091479
Sep. 17, 2004 (JP) ............... 2004-271084
Sep. 17, 2004 (JP) ............... 2004-271085

(51) Int. Cl.
H01M 10/06 (2006.01)
H01M 4/23 (2006.01)
H01M 10/42 (2006.01)
H01M 4/73 (2006.01)

(52) U.S. Cl. .......... 429/205; 429/118; 429/136; 429/204; 429/48

(58) Field of Classification Search .......... None
See application file for complete search history.

(56) References Cited

U.S. PATENT DOCUMENTS 1,699,850 A    1/1929   Lyndon (Continued)

FOREIGN PATENT DOCUMENTS

CN    2069172 U    1/1991

(Continued)

OTHER PUBLICATIONS

European Search Report issued in European Patent Application No. EP 05 72 1008, mailed Aug. 14, 2008.

(Continued)

Primary Examiner—John S Maples
(74) Attorney, Agent, or Firm—McDermott Will & Emery LLP

(57) ABSTRACT

This invention provides a lead battery that becomes usable by injecting an electrolyte thereinto. The battery includes: positive and negative electrode plates each having a grid comprising a Pb—Ca based alloy; separators that separate the positive electrode plates from the negative electrode plates; the electrolyte comprising sulfuric acid; and a battery container accommodating the positive and negative electrode plates, the separators, and the electrolyte. The battery container is sealed, and part of the positive and negative electrode plates is immersed in the electrolyte. The height $Y_0$ of the positive and negative electrode plates and the distance $Y_1$ from the bottom of the positive and negative electrode plates to the level of the electrolyte satisfy the relation:

$$15 \leq Y_1/Y_0 \times 100 \leq 60.$$

9 Claims, 6 Drawing Sheets

U.S. PATENT DOCUMENTS

| | | | |
|---|---|---|---|
| 4,743,270 A | 5/1988 | McCartney, Jr. et al. | |
| 6,403,264 B1 | 6/2002 | Bunsch et al. | |
| 6,506,522 B2 * | 1/2003 | Clough | 429/250 |
| 6,528,206 B2 * | 3/2003 | Rodriguez et al. | 429/204 |

FOREIGN PATENT DOCUMENTS

| | | | |
|---|---|---|---|
| DE | 3928468 A1 | 3/1991 | |
| JP | 52-93930 A | 8/1977 | |
| JP | 63-244568 A | 10/1988 | |
| JP | 64-60969 A | 3/1989 | |
| JP | 3-93155 A | 4/1991 | |
| JP | 8-321328 | * | 12/1996 |
| JP | 10-31991 A | 2/1998 | |
| JP | 2000-195524 A | 7/2000 | |
| JP | 2003-142150 A | 5/2003 | |
| JP | 2003-142151 A | 5/2003 | |
| JP | 2003-346790 A | 12/2003 | |
| JP | 2004-14283 A | 1/2004 | |
| RU | 2 142 179 | 11/1999 | |

OTHER PUBLICATIONS

Russian Office Action issued in Russian Patent Application No. 2006137725/09(041053), mailed Jun. 20, 2008.

* cited by examiner

LEAD BATTERY AND LEAD BATTERY STORAGE METHOD

RELATED APPLICATIONS

This application is the U.S. National Phase under 35 U.S.C. §371 of International Application No. PCT/JP2005/004821, filed on Mar. 17, 2005, which in turn claims the benefit of Japanese Application No. 2004-091479 filed on Mar. 26, 2004, Japanese Application No. 2004-271084 filed on Sep. 17, 2004, and Japanese Application No. 2004-271085 filed on Sep. 17, 2004, the disclosures of which Applications are incorporated by reference herein.

TECHNICAL FIELD

The present invention relates to a lead battery and a lead battery storage method. More particularly, the present invention relates to regulation of the amount of an electrolyte during storage of the lead battery.

BACKGROUND ART

Lead batteries have been used in various applications, such as starting of automotive engines and back-up power source. The amount of self-discharge of lead batteries is smaller than that of alkaline storage batteries. However, when lead batteries are stored for an extended period of time during their distribution process, their self-discharge may proceed such that they need to be recharged when they are used. Therefore, further suppressing the self-discharge of lead batteries is still an important technical problem to be solved.

Lead batteries have positive and negative electrode plates each including a grid, and the grid is often made of a Pb—Sb based alloy or a Pb—Ca based alloy. The self-discharge characteristics of batteries vary with the alloy type of the grid. Although Pb—Sb based alloys have good casting characteristics and high strength, the presence of Sb increases the self-discharge.

Thus, lead batteries using a Pb—Sb based alloy in the grid are stored by the following methods. One method is to store batteries that are assembled using formed electrode plates, which have been subjected to a formation treatment and dried in a production process of the electrode plates (see Patent Document 1). Another method is to inject an electrolyte into a battery assembled using unformed electrode plates, perform formation in the battery container, then discharge the electrolyte contained in the battery container, and store the battery with the electrolyte discharged.

In the case of lead batteries using a Pb—Sb based alloy in the grid, by storing them in the above manners and injecting an electrolyte immediately before using them, it is possible to prevent self-discharge during a long-term storage of unused batteries. However, there still remains a problem of being unable to suppress the self-discharge once the electrolyte is injected.

On the other hand, the use of a Pb—Ca based alloy in the grid can decrease the amount of self-discharge of the resultant lead battery to approximately ½ to ⅓ that of a battery using a Pb—Sb based alloy in the grid. However, if the ambient temperature becomes high during storage of batteries, the batteries are apt to self-discharge. Thus, even batteries using a Pb—Ca based alloy self-discharge during storage, so that they may need to be recharged when they are used. For example, in Japan, when batteries are stored for an extended period of time in a non-air-conditioned warehouse, the temperature inside the warehouse often rises to 40° C. or more during summer. Hence, batteries may need to be recharged every several months.

To recharge the batteries, they need to be unpacked, then recharged, and packed again. Since such procedure must be done manually, it takes an enormous cost for facilities and electric power necessary for recharging and an enormous time for recharging. This results in an increase in the distribution cost of batteries.

Patent Document 1: Japanese Laid-Open Patent Publication No. Sho 52-93930

DISCLOSURE OF INVENTION

Problem that the Invention is to Solve

It is therefore an object of the present invention to provide a low-cost lead battery capable of suppressing the self-discharge during a long-term storage and decreasing the frequency of recharging procedure.

Means for Solving the Problem

The present invention relates to a lead battery that becomes usable by injecting an electrolyte thereinto. The lead battery includes: positive electrode plates each including a positive electrode grid comprising a Pb—Ca based alloy and a positive electrode active material retained by the positive electrode grid; negative electrode plates each including a negative electrode grid comprising a Pb—Ca based alloy and a negative electrode active material retained by the negative electrode grid; separators that separate the positive electrode plates from the negative electrode plates; the electrolyte comprising sulfuric acid; and a battery container accommodating the positive and negative electrode plates, the separators, and the electrolyte. The battery container is sealed, and part of the positive and negative electrode plates is immersed in the electrolyte. The height $Y_0$ of the positive and negative electrode plates and the distance $Y_1$ from the bottom of the positive and negative electrode plates to the level of the electrolyte satisfy the relation:

$$15 \leq Y_1/Y_0 \times 100 \leq 60.$$

It is preferred that the height $Y_0$ of the positive and negative electrode plates and the distance $Y_1$ from the bottom of the positive and negative electrode plates to the level of the electrolyte satisfy the relation:

$$30 \leq Y_1/Y_0 \times 100 \leq 50.$$

The concentration of the sulfuric acid is preferably 7 to 27% by weight.

The electrolyte preferably contains a sulfate of alkali metal or alkaline earth metal.

It is preferred that the separators comprise polyethylene and contain oil.

It is preferred that each of the separators contains 10 to 30% by weight of the oil.

It is preferred that the separators be shaped like a bag and accommodate the negative electrode plates.

It is preferred that the positive electrode grid have a lead alloy layer at least at a part of the surface thereof, the lead alloy layer containing at least one of Sb and Sn.

The gas inside the battery container is preferably replaced with an inert gas.

The present invention also relates to a lead battery storage method for storing a lead battery including: unformed positive and negative electrode plates each having a grid comprising a Pb—Ca based alloy; separators that separate the positive electrode plates from the negative electrode plates; an electrolyte comprising sulfuric acid; and a battery container accommodating the positive and negative electrode plates, the separators, and the electrolyte. This method includes storing the lead battery, after forming the lead battery and then decreasing the amount of the electrolyte. The amount of the electrolyte is adjusted such that the height $Y_0$ of the positive and negative electrode plates and the distance $Y_1$ from the bottom of the positive and negative electrode plates to the level of the electrolyte satisfy the relation:

$15 \leq Y_1/Y_0 \times 100 \leq 60$, and the battery container is sealed while the lead battery is stored.

Effects of the Invention

According to the present invention, the self-discharge can be suppressed during a long-term storage, thereby making it possible to decrease the frequency of the recharging procedure and reduce the amount of recharged electricity.

Also, since the amount of the electrolyte during storage is small, battery weight is reduced. Further, because of decreased possibility of electrolyte leakage, battery transportation becomes easy. Accordingly, it is possible to reduce distribution costs, such as costs for transportation and storage of batteries.

BEST MODE FOR CARRYING OUT THE INVENTION

A lead battery according to the present invention basically uses a Pb—Ca based alloy, which is free from Sb that causes a large amount of self-discharge, in a positive electrode grid and a negative electrode grid. Also, the amount of an electrolyte is decreased from the amount during use, to reduce the contact between the electrolyte and the positive and negative electrode plates. Further, the battery container is sealed, to reduce the contact between the negative electrode plate and oxygen. Under such conditions, the lead battery is stored. Accordingly, when unused batteries are stored over an extended period of time, their self-discharge is suppressed.

Figure 1:
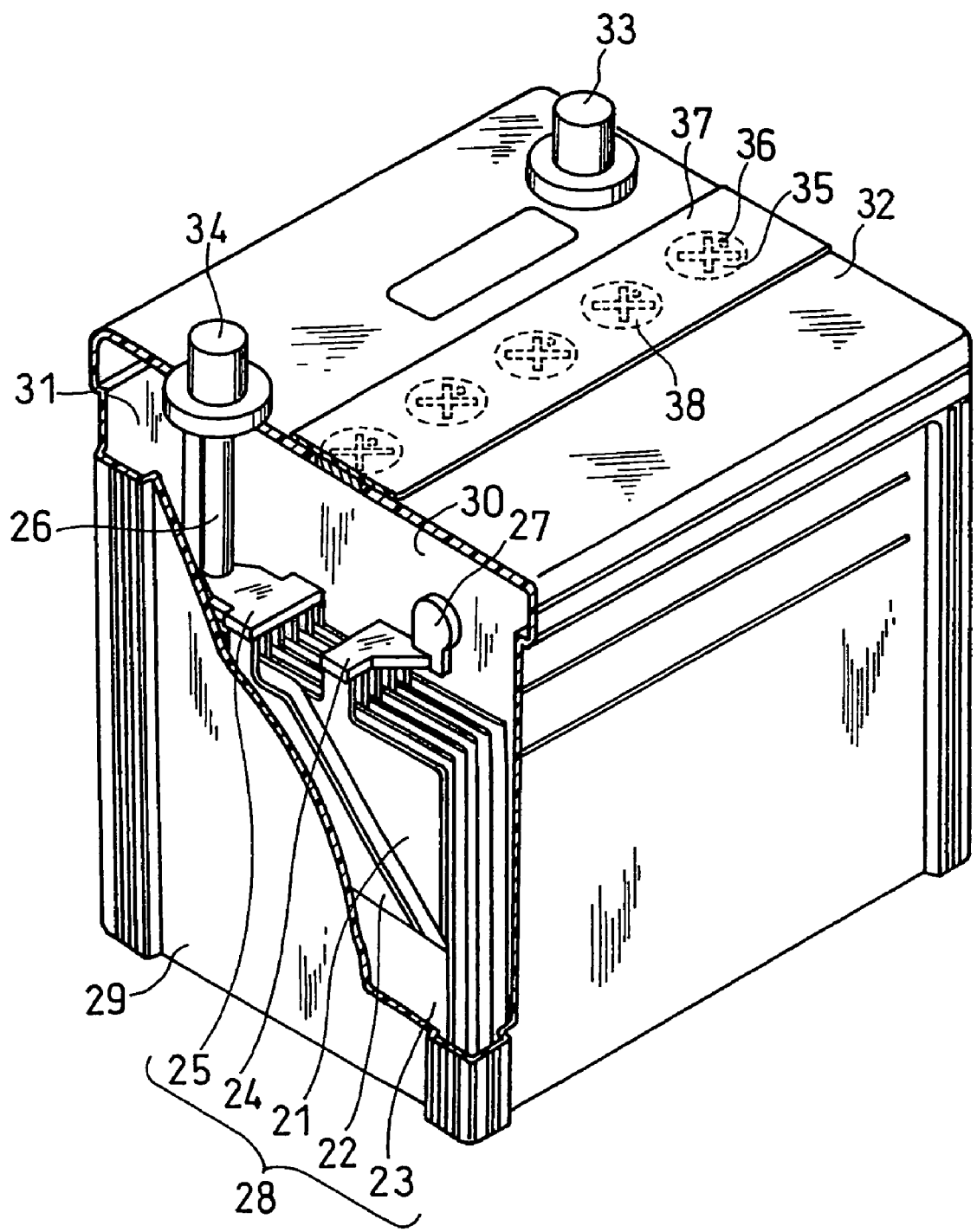
FIG. 1 is a partially cut-away perspective view of a lead battery in accordance with an example of the present invention.

Embodiments of the present invention are specifically described hereinafter. FIG. 1 is a partially cut-away perspective view of a lead battery of the present invention. The lead battery as illustrated in FIG. 1 shows an exemplary constitution for storing an unused battery over an extended period of time.

A battery container 29 is divided by partitions 30 into a plurality of cells, and each cell accommodates an electrode plate group 28. The electrode plate group 28 is formed of positive electrode plates 21, negative electrode plate 22, and separators 23. The positive electrode plates 21 each include a positive electrode grid comprising a Pb—Ca alloy and a positive electrode active material (lead dioxide) filled into the positive electrode grid. The negative electrode plates 22 each include a negative electrode grid comprising a Pb—Ca alloy and a negative electrode active material (lead) filled into the negative electrode grid. The separators 23 separate the positive electrode plates 21 from the negative electrode plates 22. The electrode plate group 28 further has a strap 24 connected to the tabs of the positive electrode plates 21 and a strap 25 connected to the tabs of the negative electrode plates 22.

A connector 27 attached to the strap 24 of the positive electrodes of the electrode plate group in one cell is connected to the connector 27 attached to the strap 25 of the negative electrodes of the electrode plate group 28 in the adjoining cell, through a through-hole (not shown) of the partition 30. Thus, the electrode plate groups 28 in adjoining cells are connected in series. At one end of the battery container 29, the strap of the positive electrodes is provided with a positive pole (not shown). At the other end, the strap 25 of the negative electrodes is provided with a negative pole 26. The positive pole and the negative pole 26 are connected to a positive electrode terminal 33 and a negative electrode terminal 34, respectively, which are provided on a cover 32.

Figure 2:
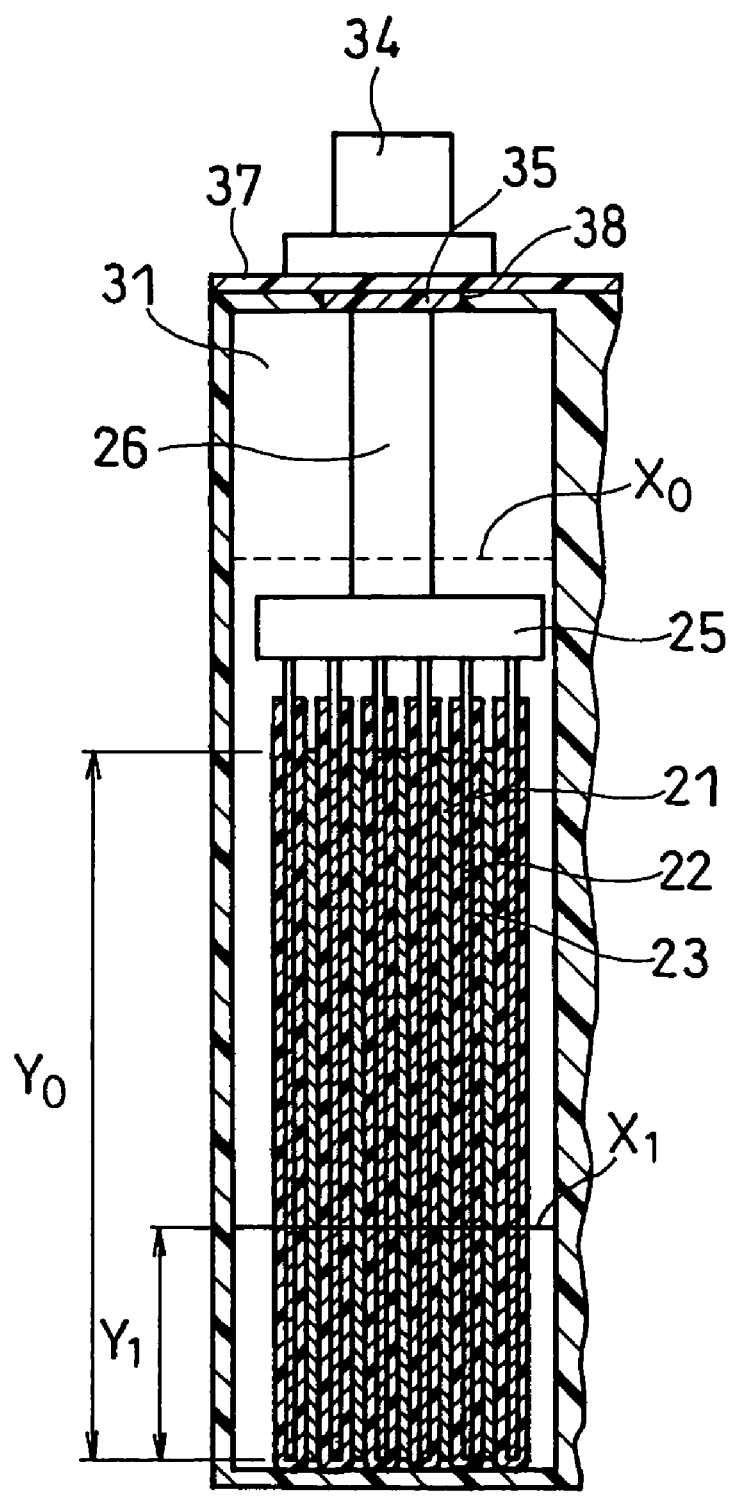
FIG. 2 is a longitudinal sectional view showing the inside of a cell of the lead battery of FIG. 1.

FIG. 2 is a longitudinal sectional view showing the inside of the cell of the lead battery of FIG. 1. For formation, an electrolyte is injected into the battery container 29, but a predetermined amount of the electrolyte is discharged after the completion of formation by turning the battery upside down or sucking out the electrolyte. FIG. 2 illustrates the state of storage, where a predetermined amount of the electrolyte has been discharged as described above. Each cell contains a given amount of the electrolyte, and part (lower part) of the positive electrode plates 21 and the negative electrode plates 22 is immersed in the electrolyte. The rate at which the positive electrode plates 21 and the negative electrode plates 22 are immersed in the electrolyte (hereinafter referred to as immersion rate) is represented by the formula: $Y_1/Y_0 \times 100$, wherein $Y_0$ denotes the height of the electrode plates (excluding the tabs) and $Y_1$ denotes the distance from the bottom of the electrode plates to the electrolyte level $X_1$, as illustrated in FIG. 2. When the immersion rate ($=Y_1/Y_0 \times 100$) is from 15 to 60%, the contact ratio of the electrode plate with the electrolyte is small, so that the self-discharge is suppressed.

The smaller the immersion rate is, the more preferable it is. However, in reality, the electrolyte is not completely discharged from the battery container 29, but remains inside the electrode plate group 28 and on the inner walls of the battery container 29. It is thus difficult to discharge the electrolyte until the immersion rate substantially lowers to below 15%. On the other hand, if the immersion rate exceeds 60%, the above-described effect of suppressing the self-discharge decreases.

The immersion rate is preferably from 30 to 50%. If the immersion rate is equal to or less than 50%, the self-discharge is further suppressed. The electrolyte remaining in the battery forms a liquid film on the surfaces of the positive electrode plates 21 and the negative electrode plates 22. If the immersion rate becomes less than 30%, the liquid film is not formed so as to cover the whole surfaces of the negative electrode plates 22, thereby creating a three-phase interface of oxygen-electrolyte-active material. At this interface, the active material is prone to deactivation, which may result in deterioration in chargeability upon battery use.

The concentration of sulfuric acid in the electrolyte during battery storage is preferably from 7 to 27% by weight. When the sulfuric acid concentration is equal to or less than 27% by weight, the self-discharge during battery storage is suppressed more than when the concentration is higher. However, if the sulfuric acid concentration becomes less than 7% by weight, the chargeability upon recharging deteriorates. The sulfuric acid concentration in the electrolyte is more preferably from 12 to 22% by weight in terms of self-discharge and chargeability.

The electrolyte during storage preferably contains a sulfate of alkali metal or alkaline earth metal, such as sodium sulfate. This improves chargeability upon recharging and increases discharge capacity after recharging.

It is preferred to add sodium sulfate to the electrolyte at about 5 to 20 g/L. If the sodium sulfate concentration is less than 5 g/L, such addition is not so effective. However, if the sodium sulfate concentration exceeds 20 g/L, discharge characteristics degrade.

The opening of the battery container 29 is covered with the cover 32 that has liquid inlets 38 for injecting the electrolyte into the battery. The liquid inlets 38 are fitted with a vent cap 35 having a vent hole 36. During a long-term storage, an adhesive tape 37 is affixed so as to cover the vent caps 35, so that the vent holes 36 are closed. Consequently, the battery is sealed air-tightly during a long-term storage. The adhesive tape 37 may be composed of an acid-resistant resin, such as polypropylene resin or polyethylene resin. When the adhesive tape 37 is used, the vent caps 35 are not necessarily be fitted.

Accordingly, during a long-term storage, air (oxygen) outside the battery is prevented from entering the battery, thereby making it possible to suppress the oxidation of the negative electrode active material (spongy lead), and hence, the production of lead sulfate by the reaction between lead oxide produced by the oxidation and the sulfuric acid in the electrolyte.

Another method for sealing the battery air-tightly is to fit the liquid inlets 38 with a sealing cap having no vent hole.

To enhance the above-mentioned sealing effects, the atmosphere inside the battery is preferably replaced with an inert gas containing no oxygen, such as nitrogen gas or argon gas.

The above-described lead battery of the present invention is obtained, for example, by the following steps 1 to 4.

(Step 1)

The electrode plate groups 28 including the unformed positive and negative electrode plates 21 and 22 are placed in the battery container 29 to obtain a lead battery, and a predetermined amount of the electrolyte is injected from the liquid inlets 38 into the battery container 29.

An unformed positive electrode plate is obtained, for example, by filling a positive electrode paste, which is a mixture of a raw material lead powder (a mixture of lead and lead oxide), sulfuric acid, water, etc., into a positive electrode grid, and curing and drying it. Also, an unformed negative electrode plate is obtained, for example, by filling a negative electrode paste, which is a mixture of a raw material lead powder (a mixture of lead and lead oxide), sulfuric acid, water, an expander such as lignin or barium sulfate, etc., into a negative electrode grid, and curing and drying it.

(Step 2)

After the step 1, the lead battery is formed.

(Step 3)

After the step 2, the electrolyte is discharged from the lead battery through the liquid inlets 38, by turning the battery upside down or sucking out the electrolyte, such that the immersion rate is from 15 to 60%.

(Step 4)

After the step 3, each of the liquid inlets 38 is fitted with the vent cap 35, and the adhesive tape 37 is affixed so as to cover the vent caps 35, in order to seal the lead battery air-tightly.

When the battery is allowed to stand for a while after the discharge of the electrolyte, the electrolyte contained in the electrode plate groups 28 and the electrolyte adhering to the inner walls of the battery container 29 move downward in the battery container, so that the positive electrode plates 21 and the negative electrode plates 22 are immersed in the electrolyte with their immersion rate ranging from 15 to 60%.

In order to make the sulfuric acid concentration of the electrolyte during battery storage 7 to 27% by weight, the sulfuric acid concentration of the electrolyte to be injected may be adjusted such that the sulfuric acid concentration of the electrolyte is from 7 to 27% by weight upon the completion of the formation. This will eliminate the need to adjust the sulfuric acid concentration in a subsequent step.

Since lead batteries using a Pb—Ca based alloy in positive and negative electrode grids include no Sb that promotes self-discharge, their self-discharge is suppressed. According to the present invention, the amount of electrolyte is decreased to a proper level, as described above. Therefore, the contact area of the positive and negative electrode plates 21 and 22 with the electrolyte is decreased, which makes it possible to further suppress the self-discharge during a long-term storage.

When the battery is used, the adhesive tape 37 and the vent caps 35 are removed from the battery, a predetermined amount of the electrolyte is refilled from the liquid inlets 38, and the vent caps 35 are fitted again.

When the battery is used, the electrolyte is refilled until the positive electrode plates 21 and the negative electrode plates 22 are totally immersed in the electrolyte. Preferably, the electrolyte is refilled up to the position $X_0$ in FIG. 2 so that the whole electrode plate group 28 including the strap 24 and the strap 25 is immersed therein. When the strap 25 of the negative electrodes is exposed from the electrolyte, in particular, the exposed part of the strap 25 comes into contact with oxygen in air, which may result in corrosion of the strap 25 or the connected part of the strap 25 with the tabs of the negative electrode plates 22.

The separators 23 are shaped like a bag and are made of a microporous sheet composed mainly of polyethylene resin. The microporous sheet has pores of approximately 0.01 to 1 μm in size, through which the electrolyte is capable of permeating. If the pore size exceeds 1 μm, the active material can easily pass through the separator.

The bag-shaped separators 23 are placed such that their openings face upward, and the negative electrode plates 22 are accommodated therein such that their tabs are positioned on the opening side. There is affinity between the electrolyte and the separators 23 and between the electrolyte and the negative electrode active material. Thus, even after the electrolyte has been discharged from the battery following the formation in the battery container, the electrolyte remains inside the separators 23. The liquid film of this remaining electrolyte covers part of the surfaces of the negative electrode plates 22, and the electrolyte allows the negative electrode plates 22 to closely adhere to the separators 23. As a result, the contact of the negative electrode plates 22 with oxygen can be suppressed.

As described above, the negative electrode plates 22 retain the electrolyte, but the amount of the retained electrolyte is remarkably small, i.e., the electrolyte amount is just small enough to form a liquid film on the surfaces of the negative electrode plates 22. Accordingly, the self-discharge caused by the contact of the negative electrode active material with the electrolyte is suppressed.

It is preferred that each of the separators 23 contains 10 to 30% by weight of oil. In this case, the self-discharge during storage can be further suppressed. At first, oil is contained in the separators 23, but the oil in the separators 23 gradually comes out into the electrolyte. This oil adheres to the surfaces of the negative electrode plates 22, thereby reducing the contact between the negative electrode plates 22 and the electrolyte, or the contact between the negative electrode plates 22 and the oxygen gas in the battery container 29. This is considered to be the reason why the self-discharge of the negative electrode plates 22 is suppressed.

The larger the amount of oil contained in the separators 23 is, the more effectively the self-discharge is suppressed. However, if the amount of oil contained in each separator 23 exceeds 30% by weight, the inner walls of the battery container 29 become dirty with the oil, so that it may become difficult to identify the electrolyte level. On the other hand, if the amount of oil contained in each separator 23 is less than 10% by weight, the effect of suppressing self-discharge becomes insufficient.

As the oil, for example, mineral oil that is obtained by removing volatile components, tar and pitch from petroleum is used. For example, paraffin type (linear-chain saturated hydrocarbon) mineral oil with a density of approximately 0.85 to 0.90 g/cm$^3$ is used.

When the battery is used, the electrolyte is refilled until the electrolyte level becomes higher than the electrode plates. Thus, all the oil adhering to the surfaces of the electrode plates during storage move upward above the electrode plates during battery use, spreading in the form of a film on the surface of the electrolyte. As a result, there is no oil between the electrolyte and the electrode plates during battery use, and hence, the oil has no adverse effects on electrode reaction.

The oil which has come out into the inside of the bag-shaped separators 23 tends to stay in the electrolyte in the bag-shaped separators 23. Therefore, it is preferred to accommodate the negative electrode plates 22 in the bag-shaped separators 23, rather than to place the negative electrode plates 23 outside the bag-shaped separators, since the amount of oil adhering to the surfaces of the negative electrode plates 22 increases.

It is preferred that the positive electrode grid comprising a Pb—Ca based alloy contain 0.05 to 0.1% by weight of Ca, since the mechanical strength of the positive electrode grid is improved. In order to improve the corrosion resistance of the positive electrode grid, it is preferred that the Pb—Ca based alloy further contains 1.0 to 2.2% by weight of Sn.

It is preferred that the positive electrode grid contains a lead alloy layer including at least one of Sb and Sn at least at a part of the surface thereof.

In using a battery that has been stored for an extended period of time with the contact area of the positive electrode plates 21 with the electrolyte being small, if the electrolyte is injected so that the positive electrode plates are totally immersed in the electrolyte, a passivated layer tends to form at the interface between the positive electrode grid and the positive electrode active material. The passivated layer is an insulating layer of lead sulfate or lead oxide formed on the surface of the positive electrode grid, and the formation of this layer results in a sharp decline in chargeability and discharge capacity. Such a passivated layer tends to form particularly in batteries whose positive electrode grids are made of a Pb—Ca based alloy.

When the positive electrode grid has a lead alloy layer including at least one of Sb and Sn at least at a part of the surface thereof, it is possible to suppress degradation in battery performance due to this passivated layer. Sn produces the effect of improving the conductivity of the passivated layer, while Sb produces the effect of suppressing the formation of the passivated layer itself.

The lead alloy layer, which is used for the above-mentioned purpose, is preferably made of a Pb—Sb alloy containing 1.0 to 10% by weight of Sb. In this case, the adhesion between the positive electrode active material and the positive electrode grid is improved. Further, part of Sb dissolved in the positive electrode active material improves the binding force between the positive electrode active material particles, thereby leading to an improvement in chargeability of the positive electrode plate. Since Sb in the lead alloy layer is partially present only on the surface of the positive electrode grid in very small amounts, Sb produces little effect on self-discharge.

Another preferable lead alloy layer is made of a Pb—Sn alloy containing 3 to 7% by weight of Sn. Even if the Sn content exceeds 7% by weight, the resultant effect is the same as that when the Sn content is 7% by weight. Thus, for the purpose of limiting the amount of expensive Sn, the Sn content in the lead alloy layer is preferably not greater than 7% by weight. On the other hand, if the Sn content is less than 3% by weight, the effect of Sn decreases.

A positive electrode grid having a lead alloy layer on its surface is obtained as follows. For example, in a rolling process, a base material sheet made of a Pb—Ca based alloy material in the same manner as the above-mentioned grid, and a lead alloy foil including at least one of Sb and Sn are fed together between pairs of reduction rollers. As a result, the lead alloy foil is attached under pressure to the base material sheet, thereby producing a composite sheet of the base material layer and the lead alloy layer. Subsequently, this composite sheet is subjected to an expanding process, to produce a positive electrode grid. In the composite sheet, the thickness of the base material layer is preferably 0.7 to 1.3 mm, and the thickness of the lead alloy layer is preferably 0.01 to 20 μm.

The negative electrode grid made of a Pb—Ca based alloy preferably contains 0.05 to 0.1% by weight of Ca. In this case, the mechanical strength of the negative electrode grid can be improved without lowering the hydrogen overvoltage of the negative electrode grid. It is preferred that the Pb—Ca based alloy further contain approximately 0.5% by weight of Sn, in order to further improve the mechanical strength of the negative electrode grid.

As described above, in the lead battery of the present invention, its self-discharge during a long-term storage can be suppressed. Therefore, the frequency of recharging performed during a long-term storage can be decreased, and the costs for recharging can be reduced.

Also, since the amount of the electrolyte is small, the battery becomes lightweight. Since the lead battery of the present invention is sealed, electrolyte leakage is suppressed. Accordingly, the lead battery can be transported more easily.

In the above description, the bag-shaped separator is configured to accommodate the negative electrode plate; however, a sheet-shaped separator may be folded in a U-shape so as to accommodate the negative electrode plate therebetween.

Examples of the present invention are specifically described hereinafter.

EXAMPLE 1

(1) Production of Positive Electrode Plate

Figure 3:
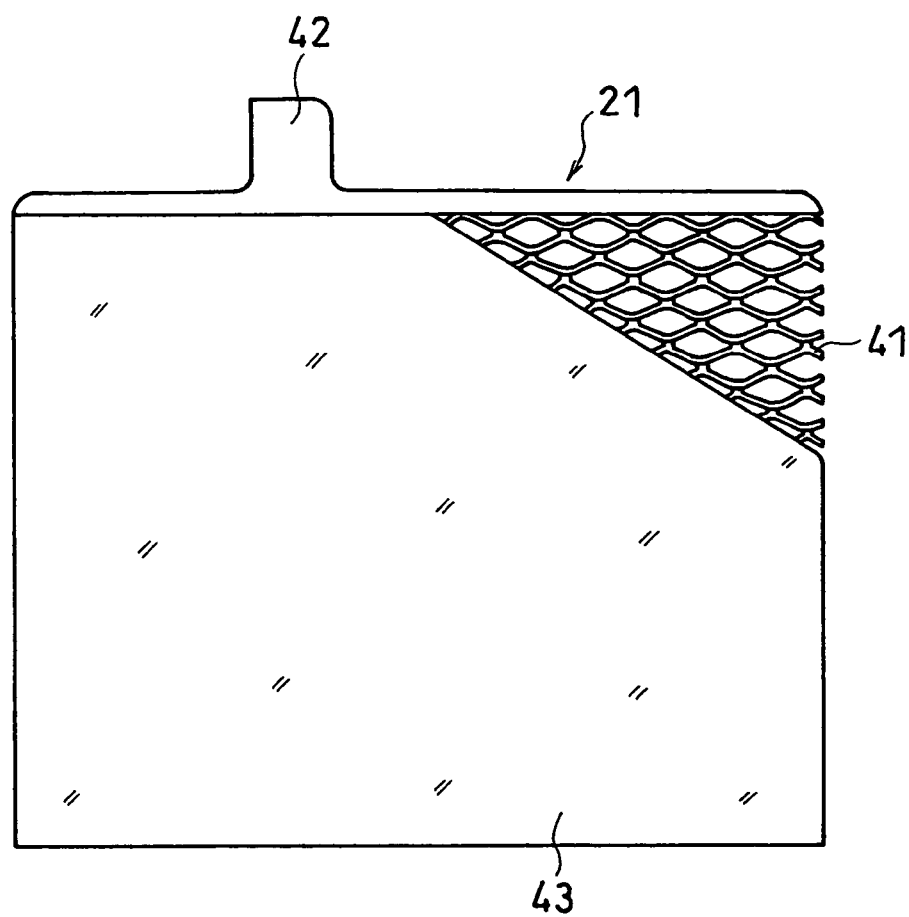
FIG. 3 is a front view of a positive electrode plate of the same lead battery.

The positive electrode plate 21 as illustrated in FIG. 3 was produced in the following manner.

A Pb alloy sheet containing 0.06% by weight of Ca and 1.30% by weight of Sn obtained by a casting process was rolled to a thickness of 1.1 mm and subjected to an expanding process, to obtain a positive electrode grid 41 (115 mm in length and 137.5 mm in width) with a tab 42.

Meanwhile, a raw material lead powder (a mixture of lead and lead oxide), water and sulfuric acid were mixed and kneaded together in a weight ratio of 100:15:5, to obtain a positive electrode paste 43.

Subsequently, 100 g of the positive electrode paste 43 was filled into the positive electrode grid 41, cured and dried, to obtain the unformed positive electrode plate 21.

(2) Production of Negative Electrode Plate

Figure 4:
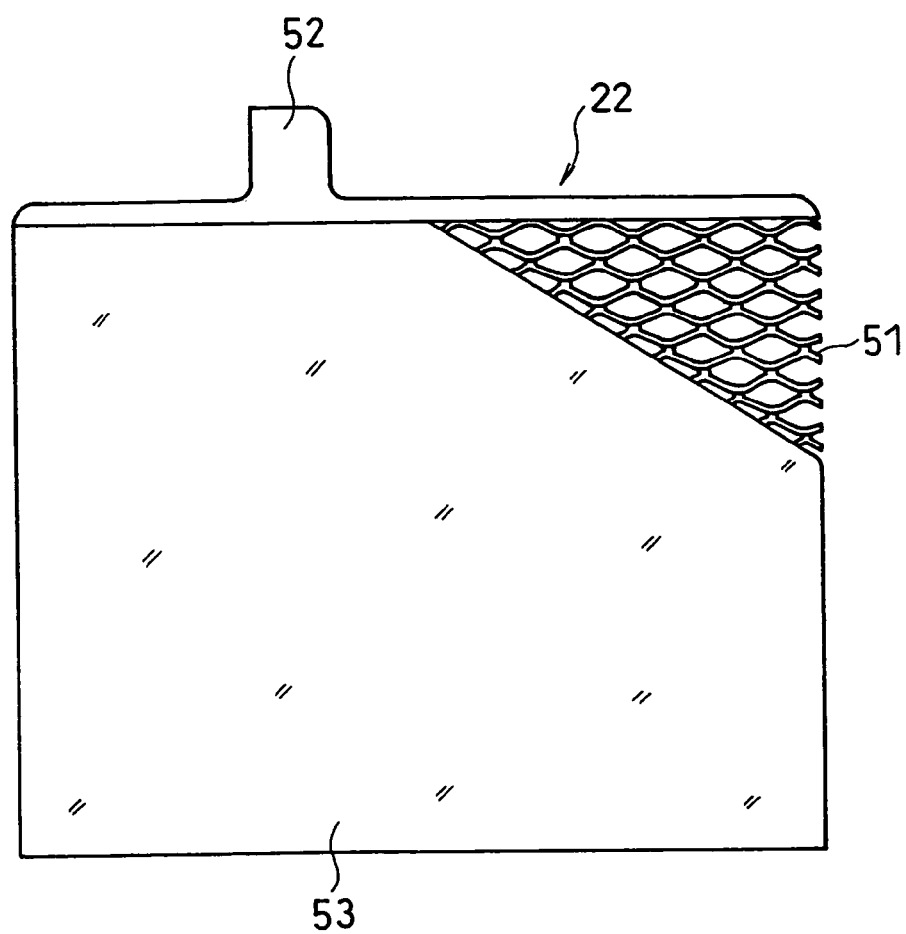
FIG. 4 is a front view of a negative electrode plate of the same lead battery.

The negative electrode plate 22 as illustrated in FIG. 4 was produced in the following manner.

A Pb alloy sheet containing 0.06% by weight of Ca and 0.30% by weight of Sn obtained by a casting process was rolled to a thickness of 0.7 mm and subjected to an expanding process, to obtain a negative electrode grid 51 (115 mm in length and 137.5 mm in width) with a tab 52.

Meanwhile, a raw material lead powder, water, sulfuric acid, and additives of lignin and barium sulfate were mixed and kneaded together in a weight ratio of 100:15:3.5:2.5:2.5, to obtain a negative electrode paste 53. Subsequently, 75 g of the negative electrode paste 53 was filled into the negative electrode grid 51, cured and dried, to obtain the unformed negative electrode plate 22.

(3) Assembly of Lead Battery

A lead battery with the structure as illustrated in FIG. 1 was assembled in the following manner. FIG. 1 is a partially cut-away perspective view of the lead battery.

Each of six negative electrode plates 22 obtained in the above manner was placed in each of the bag-shaped separators 23. These negative electrode plates 22 and five positive electrode plates 21 obtained in the above manner were alternately stacked, so that the positive electrode plates 21 and the negative electrode plates 22 were stacked with the bag-shaped separators 23 positioned therebetween. Thereafter, the straps 24 and 25 were formed by welding together the tabs 42 and 52 of the electrode plates of the same polarity, respectively. This gave the electrode plate group 28. The bag-shaped separators 23 used in this process were made of microporous polyethylene with a pore size smaller than 1 μm. The electrode plate group 28 was placed into each of six cells 31 divided by the partitions 30 of the battery container 29, and adjoining electrode plate groups 28 were connected in series by the connector 27 attached to the strap 24. In this example, the connection between the electrode plate groups was made via a through-hole (not shown) formed in the partition 30.

At opposite ends of the series connection, a positive pole (not shown) was formed in the electrode plate group 28 located at one end thereof, and the negative pole 26 was formed in the electrode plate group 28 located at the other end. The cover 32 was fitted to the opening of the battery container 29, and the positive electrode terminal 33 and the negative electrode terminal 34 provided on the cover 32 were welded to the positive pole and the negative pole 26, respectively. Thereafter, 700 ml of sulfuric acid with a concentration of 34% by weight was injected as the electrolyte into each cell from the liquid inlets 38 formed in the cover 32, and formation was performed in the battery container. After the formation, each liquid inlet 38 was fitted with the vent cap 35 that had the vent hole 36 for discharging gas generated inside the battery to the outside of the battery. This gave a starting lead battery of 55D23-type (12V-48Ah) defined by JIS D5301 (hereinafter referred to as battery).

In the battery production as described above, the electrolyte was adjusted such that the sulfuric acid concentration of the electrolyte in each cell after the formation was 37% by weight, and that the amount of the electrolyte was 700 ml per cell. At this time, the electrolyte level was positioned at $X_0$ in FIG. 2, so that the positive electrode plates 21 and the negative electrode plates 22, and the straps 24 and 25 were totally immersed in the electrolyte. This battery was named battery A (Comparative Example).

After the completion of the formation, the sulfuric acid concentration of the electrolyte and the amount of the electrolyte were adjusted to various values as listed in Table 1. The sulfuric acid concentration was adjusted in the range of 5 to 37% by weight after the formation, and the amount of the electrolyte was then adjusted to various values as listed in Table 1 by discharging part of the electrolyte from the battery. The discharge of the electrolyte from the battery was performed by turning the battery upside down, and the time for which the battery was turned upside down was varied to adjust the amount of discharged electrolyte.

In Table 1, the electrolyte amounts 350 ml, 280 ml, 245 ml, 140 ml, and 70 ml correspond to 50%, 40%, 35%, 20%, and 10% by weight of the predetermined electrolyte amount (700 ml), respectively, and the immersion rates are then 75%, 60%, 50%, 30% and 15%, respectively.

The immersion rate was obtained from the ratio of the distance $Y_1$ between the bottom of the electrode plates and the electrolyte level $X_1$ to the height $Y_0$ of the electrode plates ($=Y_1/Y_0 \times 100$).

In order to achieve the immersion rates of 75%, 60%, 50%, 30%, and 15%, the batteries were turned upside down for 15, 20, 30, 80, and 180 seconds, respectively. The position of the electrolyte level $X_1$ was visually checked upon the lapse of 30 minutes after the discharge of the electrolyte.

TABLE 1

| | Electrolyte during storage | | | | Discharge test after storage | |
| --- | --- | --- | --- | --- | --- | --- |
| Battery | Electrolyte amount (ml/cell) | Immersion rate (%) | Sulfuric acid concentration (wt %) | Sodium sulfate | Remaining discharge duration (hr) | Recovery discharge duration (hr) |
| A | 700 | 100 | 37 | None | 16.2 | 20.1 |
| A' | 700 | 100 | 37 | Added | 16.2 | 20.1 |
| B1 | 350 | 75 | 5 | None | 16.7 | 19.2 |

TABLE 1-continued

| | Electrolyte during storage | | | | Discharge test after storage | |
|---|---|---|---|---|---|---|
| Battery | Electrolyte amount (ml/cell) | Immersion rate (%) | Sulfuric acid concentration (wt %) | Sodium sulfate | Remaining discharge duration (hr) | Recovery discharge duration (hr) |
| B2 | 350 | 75 | 7 | None | 17.7 | 20.2 |
| B3 | 350 | 75 | 27 | None | 17.8 | 20.2 |
| B4 | 350 | 75 | 37 | None | 16.4 | 20.1 |
| C1 | 280 | 60 | 5 | None | 16.7 | 19.0 |
| C2 | 280 | 60 | 7 | None | 18.0 | 20.3 |
| C3 | 280 | 60 | 27 | None | 18.6 | 20.3 |
| C4 | 280 | 60 | 37 | None | 16.3 | 20.1 |
| D1 | 245 | 50 | 5 | None | 16.7 | 18.9 |
| D1' | 245 | 50 | 5 | Added | 16.8 | 19.0 |
| D2 | 245 | 50 | 7 | None | 18.1 | 20.2 |
| D2' | 245 | 50 | 7 | Added | 18.3 | 20.6 |
| D3 | 245 | 50 | 12 | None | 18.8 | 20.5 |
| D3' | 245 | 50 | 12 | Added | 19.0 | 20.6 |
| D4 | 245 | 50 | 22 | None | 18.9 | 20.5 |
| D4' | 245 | 50 | 22 | Added | 19.1 | 20.7 |
| D5 | 245 | 50 | 27 | None | 18.6 | 20.5 |
| D5' | 245 | 50 | 27 | Added | 19.0 | 20.6 |
| D6 | 245 | 50 | 37 | None | 16.3 | 20.4 |
| D6' | 245 | 50 | 37 | Added | 16.3 | 20.4 |
| E1 | 140 | 30 | 5 | None | 16.8 | 19.0 |
| E2 | 140 | 30 | 7 | None | 18.1 | 20.4 |
| E3 | 140 | 30 | 27 | None | 18.6 | 20.4 |
| E4 | 140 | 30 | 37 | None | 16.5 | 20.2 |
| F1 | 70 | 15 | 5 | None | 16.9 | 19.0 |
| F2 | 70 | 15 | 7 | None | 18.1 | 20.2 |
| F3 | 70 | 15 | 27 | None | 18.2 | 20.6 |
| F4 | 70 | 15 | 37 | None | 16.8 | 20.1 |

Batteries B1 to B4, C1 to C4, D1 to D6, E1 to E4, and F1 to F4 were produced by varying the sulfuric acid concentration and the electrolyte amount, as described above.

Also, a battery A' and batteries D1' to D6' were produced by further adding sodium sulfate to the electrolyte of the battery A and the batteries D1 to D6 at 10 g/l.

The batteries produced in the above manner were sealed air-tightly, by covering all the vent caps 35 of these batteries with the adhesive tape 37 made of polypropylene resin, to close the vent holes 36. The vent caps 35 used were equipped with a splash-proof plate, in order to prevent the electrolyte from overflowing easily from the battery even when the electrolyte level fluctuates. It should be noted that the batteries A, A' and batteries B1 to B4 represent comparative examples, and that the batteries C1 to C4, D1 to D6, D1' to D6', E1 to E4 and F1 to F4 represent examples of the present invention.

[Battery Evaluation]

Each of the above-mentioned batteries was stored in a constant temperature room of 40° C. for 3 months. After the storage, the adhesive tape was peeled off, and the vent caps were taken out. The electrolyte was then refilled from the liquid inlets such that the sulfuric acid concentration in the electrolyte was 37% by weight, and that the electrolyte amount was 700 ml per cell (i.e., the electrolyte level was positioned at $X_0$ in FIG. 2).

Under an atmosphere of 25° C., each battery was discharged at a cut-off voltage of 10.5 V and an hour rate of 20 hours (current value: 2.88 A), to measure remaining discharge duration. Subsequently, each battery was subject to recovery charge under an atmosphere of 25° C. (constant voltage charge: predetermined voltage 14.8 V, maximum current 25 A, and charging time 12 hours). Thereafter, each battery was discharged again at a cut-off voltage of 10.5 V and an hour rate of 20 hours, to measure recovery discharge duration. Table 1 shows the measurement results.

Table 1 indicates that the batteries C1 to C4, D1 to D6, D1' to D6', E1 to E4, and F1 to F4, with their immersion rates ranging from 15 to 60%, had long remaining discharge durations after the 3-month storage at 40° C. This is probably because the regulation of the electrolyte amount reduced the contact area between the electrolyte and the active material, thereby suppressing self-discharge. The batteries D1 to D6, D1' to D6', and E1 to E4, with their immersion rates ranging from 30 to 50%, exhibited further improved discharge characteristics after storage.

When the sulfuric acid concentration in the electrolyte is 5% by weight, the self-discharge is small, so the remaining discharge duration was long, but the recovery discharge duration decreased. It is therefore preferred that the sulfuric acid concentration in the electrolyte be 7% by weight or higher.

The results of the batteries D1 to D6 and D1' to D6' have shown that although the addition of sodium sulfate to the electrolyte had almost no effects on the remaining discharge duration, it caused an increase in the recovery discharge duration. These results have particularly shown that when the sulfuric acid concentration in the electrolyte during storage is 7% by weight or higher, the lower the sulfuric acid concentration is, the more the recovery discharge duration increases.

When the self-discharge is suppressed by regulating the electrolyte amount and the sulfuric acid concentration in the electrolyte, the amount of sulfuric acid ions is restricted. Thus, battery chargeability and the recovery discharge duration tend to lower. If sodium sulfate is added in such conditions where the electrolyte amount is small, sulfuric acid ions are refilled, so that the deterioration of chargeability is suppressed, thereby resulting in an increase in recovery discharge duration.

Further, when the sulfuric acid concentration exceeded 27% by weight, the remaining discharge duration decreased, because lead sulfate is apt to form due to an increase in the amount of sulfuric acid. This indicates that the sulfuric acid concentration is preferably from 7 to 27% by weight. In the batteries D3, D4, D3' and D4', with their sulfuric acid concentration ranging from 12 to 22% by weight, their discharge characteristics after storage were further improved.

It is noted that the amount of electrolyte of the battery D3 of the example according to the present invention during storage is 245 ml per cell. Since the density of the electrolyte with a sulfuric acid concentration of 27% by weight is approximately 1.184 g/ml at 25° C., the weight of the electrolyte is approximately 1740 g per battery.

On the other hand, the amount of electrolyte of the battery A of the comparative example during storage is 700 ml per cell. Since the density of the electrolyte with a sulfuric acid concentration of 37% by weight is approximately 1.273 g/ml at 25° C., the weight of the electrolyte is approximately 5350 g per battery.

Accordingly, in the lead battery of the present invention, the battery weight during storage can be significantly reduced, so that distribution costs, such as transportation and storage costs, can be cut.

EXAMPLE 2

Bag-shaped separators, which were the same as those of Example 1, were allowed to contain oil in various amounts as listed in Table 2. The oil content in Table 2 is the percentage relative to the weight of the bag-shaped separator containing the oil. As the oil, mineral oil (Daphne oil CP manufactured by Idemitsu Kosan Co., Ltd.) was used. Batteries G2 to G6 were produced in the same manner as the battery A of Example 1, except for the use of the oil-containing bag-shaped separators. As a comparative example, a battery G1 (with the same constitution as that of the battery A) was produced using oil-free bag-shaped separators.

Also, batteries H1 to H6 were produced in the same manner as the battery A of Example 1, except that the above-mentioned separator accommodated the positive electrode plate instead of the negative electrode plate.

Further, batteries I1 to I6 were produced by discharging the electrolyte from the batteries G1 to G6 such that the electrolyte amount was 245 ml per cell (immersion rate 50%). Batteries J1 to J6 were produced by discharging the electrolyte from the batteries H1 to H6 such that the electrolyte amount was 245 ml per cell (immersion rate 50%). It should be noted that the batteries G1 to G6 and H1 to H6 represent comparative examples, while the batteries I1 to I6 and J1 to J6 represent examples of the present invention.

[Battery Evaluation]

Each of the above-mentioned batteries was measured for its remaining discharge duration after a 6-month storage, in the same manner as in Example 1. Table 2 shows the measurement results.

TABLE 2

| Battery | Electrolyte during storage | | Bag-shaped separator | | Remaining discharge duration (hr) |
|---|---|---|---|---|---|
| | Electrolyte amount (ml/cell) | Immersion rate (%) | Electrode plate accommodated | Oil content (wt %) | |
| G1 | 700 | 100 | Negative electrode plate | 0 | 16.2 |
| G2 | 700 | 100 | Negative electrode plate | 5 | 16.2 |
| G3 | 700 | 100 | Negative electrode plate | 10 | 16.2 |
| G4 | 700 | 100 | Negative electrode plate | 15 | 16.3 |
| G5 | 700 | 100 | Negative electrode plate | 25 | 16.3 |
| G6 | 700 | 100 | Negative electrode plate | 30 | 16.4 |
| H1 | 700 | 100 | Positive electrode plate | 0 | 16.2 |
| H2 | 700 | 100 | Positive electrode plate | 5 | 16.2 |
| H3 | 700 | 100 | Positive electrode plate | 10 | 16.2 |
| H4 | 700 | 100 | Positive electrode plate | 15 | 16.2 |
| H5 | 700 | 100 | Positive electrode plate | 25 | 16.3 |
| H6 | 700 | 100 | Positive electrode plate | 30 | 16.3 |
| I1 | 245 | 50 | Negative electrode plate | 0 | 16.3 |
| I2 | 245 | 50 | Negative electrode plate | 5 | 17.4 |
| I3 | 245 | 50 | Negative electrode plate | 10 | 18.4 |
| I4 | 245 | 50 | Negative electrode plate | 15 | 18.6 |
| I5 | 245 | 50 | Negative electrode plate | 25 | 18.6 |
| I6 | 245 | 50 | Negative electrode plate | 30 | 18.6 |
| J1 | 245 | 50 | Positive electrode plate | 0 | 16.3 |
| J2 | 245 | 50 | Positive electrode plate | 5 | 17.4 |
| J3 | 245 | 50 | Positive electrode plate | 10 | 17.6 |
| J4 | 245 | 50 | Positive electrode plate | 15 | 17.9 |
| J5 | 245 | 50 | Positive electrode plate | 25 | 18.0 |
| J6 | 245 | 50 | Positive electrode plate | 30 | 18.0 |

In the batteries I2 to I6 and J2 to J6, which were stored with the electrolyte in the battery being decreased and with the separators containing oil, their self-discharge was suppressed, and hence, their discharge durations were longer than those of the batteries I1 and J1. The batteries I3 to I6 and J3 to J6, in particular, exhibited further improved discharge characteristics after storage. On the other hand, the batteries G2 to G6 and H2 to H6, whose electrolyte was not discharged, did not produce as much effects as the batteries whose electrolyte was discharged, although the remaining discharge duration changed slightly depending on the oil content in the separator.

Although this mechanism is not yet known, it is considered as follows. When the electrolyte was discharged, the oil in the electrolyte formed a film on the exposed surfaces of the negative electrode plates. This oil film reduced the contact between the negative electrode plates and the electrolyte and the oxygen present in the battery, thereby suppressing the self-discharge.

Further, the batteries whose negative electrode plates were accommodated in the bag-shaped separators produced superior self-discharge characteristics to the batteries whose positive electrode plates were accommodated in the bag-shaped separators.

The reason is considered as follows. The oil that has come out from the outer side of the bag-shaped separators diffuses in the battery container, while the oil that has come out from the inner side of the bag-shaped separators stays inside the separators. Therefore, when the bag-shaped separators accommodate the negative electrode plates, an oil film is apt to form on the surfaces of the negative electrode plates.

In the foregoing Example 2, the immersion rate was 50%; however, when the immersion rate was in the range of 15 to 60%, the same results as those of Example 2 were obtained.

EXAMPLE 3

Figure 5:
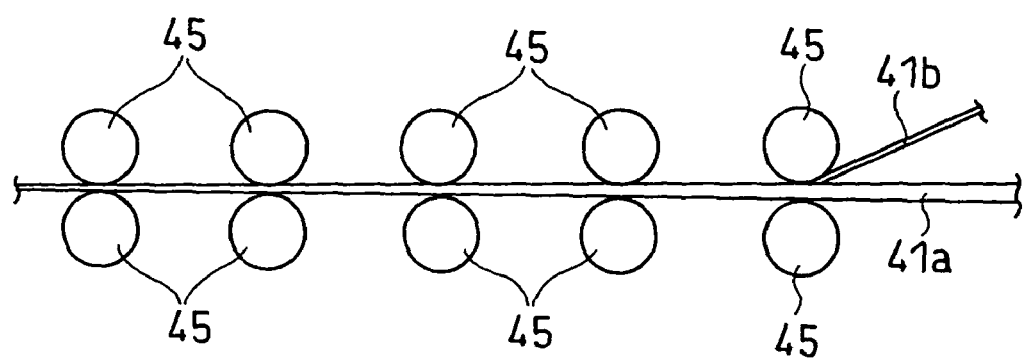
FIG. 5 is a diagram showing producing a composite sheet for a grid.

In the rolling process, a base material sheet 41a and a lead alloy foil 41b were fed together between pairs of reduction rollers 45, as illustrated in FIG. 5, so that the base material sheet 41a and the lead alloy foil 41b were simultaneously rolled by the reduction rollers 45. As a result, the lead alloy foil 41b was attached under pressure to the base material sheet 41a, which gave a composite sheet consisting of a 1.1-mm-thick base material sheet with a 20-μm-thick lead alloy layer on one side thereof. As the lead alloy foil 41b, a Pb alloy containing 5.0% by weight of Sb was used. As the base material sheet 41a, the same material as that of the positive electrode grid of Example 1 was used.

Figure 6:
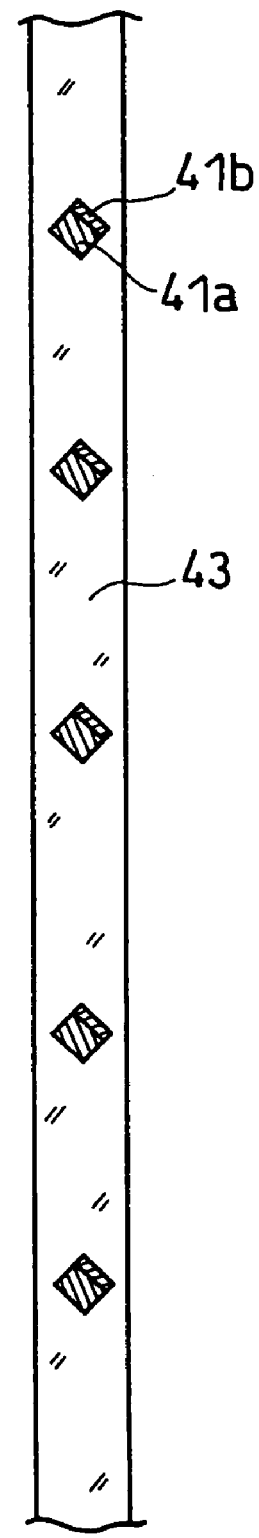
FIG. 6 is a longitudinal sectional view showing a part of a positive electrode plate including a positive electrode grid that has a lead alloy layer on the surface thereof.

This composite sheet was subjected to an expanding process, to obtain a positive electrode grid. Using this positive electrode grid, a positive electrode plate was obtained in the same manner as in Example 1. As illustrated in FIG. 6, this positive electrode grid has a Pb alloy layer containing 5% by weight of Sb on one face of a diamond-shaped grid.

A battery K1 was produced in the same manner as the battery A of Example 1, except for using the positive electrode grids obtained in the above manner and setting the electrolyte amount after formation to 200 ml (immersion rate 40%) (corresponding to 28.6% by weight of the electrolyte amount of the battery A) per cell.

EXAMPLE 4

A battery K2 was produced in the same manner as in Example 3, except that all the bag-shaped separators in the electrode plate groups accommodated the positive electrode plates instead of the negative electrode plates.

EXAMPLE 5

A battery K3 was produced in the same manner as in Example 3, except for the use of the positive electrode grids of Example 1 instead of the positive electrode grids of Example 3.

EXAMPLE 6

A battery K4 was produced in the same manner as in Example 3, except that the gas inside the battery was replaced with nitrogen gas before sealing the battery with the vent caps and adhesive tape.

COMPARATIVE EXAMPLE 1

A battery K5 was produced in the same manner as in Example 3, except that the battery was not sealed with the adhesive tape and the vend caps.

COMPARATIVE EXAMPLE 2

A battery K6 was produced in the same manner as in Example 3, except that the electrolyte amount was set to 700 ml per cell without discharging the electrolyte after formation.

COMPARATIVE EXAMPLE 3

A battery K7 was produced in the same manner as in Comparative Example 2, except that all the bag-shaped separators in the electrode plate groups accommodated the positive electrode plates instead of the negative electrode plates.

[Battery Evaluation]

The batteries K1 to K7 obtained in the above manner were measured for their remaining discharge duration after a 3-month storage, in the same manner as in Example 1. Further, they were also measured for their remaining discharge duration after a 6-month storage. Table 3 shows the measurement results. Further, it also shows the measurement results of the battery A of comparative example.

TABLE 3

| Battery | Remaining discharge duration (hr) | |
| --- | --- | --- |
| | After 3-month storage | After 6-month storage |
| K1 | 18.8 | 18.0 |
| K2 | 18.2 | 17.0 |
| K3 | 18.8 | 14.0 |
| K4 | 19.0 | 18.4 |
| K5 | 18.3 | 12.0 |
| K6 | 18.0 | 16.2 |
| K7 | 18.0 | 16.2 |
| A | 18.0 | 16.2 |

After the 3-month storage, the batteries K1 to K5, which were stored with the amount of electrolyte being decreased, exhibited longer remaining discharge durations because of the suppression of their self-discharge, than the batteries K6 and K7, which were stored with the usual amount of electrolyte. However, after the 6-month storage, the batteries K3 and K5 exhibited slightly shorter remaining discharge durations than the batteries K6 and K7. It is therefore preferred to employ the constitutions of the batteries K1, K2, and K4 when batteries are stored for about 6 months.

The results of the batteries A and K6 have indicated that when the electrolyte is not decreased during battery storage, the presence or absence of the lead alloy layer on the surface of the positive electrode grid hardly affects the remaining discharge duration. The results of the batteries K1 and K3 have revealed that especially when the storage period is 6 months, the provision of the lead alloy layer on the surface of the positive electrode grid permits an improvement in discharge characteristics.

The remaining discharge characteristics of the battery K1 were better than those of the battery K2. This has shown that when the amount of electrolyte is decreased in a battery, accommodating the negative electrode plate in the bag-shaped separator enables a further increase in remaining discharge duration. Further, the results of the batteries K6 and K7 have indicated that this effect cannot be obtained from conventional batteries.

In the foregoing Examples 3, 4 and 6, the lead alloy layer formed on the surface of the positive electrode grid was composed of a Pb—Sb alloy. However, even when it was composed of a Pb—Sn alloy, such as a Pb alloy containing 5.0% by weight of Sn, or a Pb—Sn—Sb alloy, such as a Pb alloy containing 5.0% by weight of Sn and 5.0% by weight of Sb, the same effects as those of Examples 3, 4 and 6 were obtained. Also, in the Examples 3 to 6, the immersion rate was 40%, but when the immersion rate was in the range of 15 to 60%, the same results as those of Examples 3 to 6 were obtained.

INDUSTRIAL APPLICABILITY

The lead battery of the present invention has excellent discharge characteristics after a long-term storage, since their self-discharge during the long-term storage is suppressed. Therefore, they are preferably used to start automotive engines and as back-up power sources.

The invention claimed is:

1. A lead battery that becomes usable by injecting an electrolyte thereinto, said lead battery comprising:
    positive electrode plates each including a positive electrode grid comprising a Pb—Ca based alloy, and a positive electrode active material retained by said positive electrode grid;
    negative electrode plates each including a negative electrode grid comprising a Pb—Ca based alloy, and a negative electrode active material retained by said negative electrode grid;
    separators that separate said positive electrode plates from said negative electrode plates;
    the electrolyte containing 7 to 27% by weight of sulfuric acid; and
    a battery container accommodating said positive and negative electrode plates, said separators, and said electrolyte,
    wherein said battery container is sealed,
    part of said positive and negative electrode plates is immersed in the electrolyte, and
    the height $Y_0$ of said positive and negative electrode plates and the distance $Y_1$ from the bottom of said positive and negative electrode plates to the level of said electrolyte satisfy the relation:

$30 \leq Y_1/Y_0 \times 100 \leq 60$, said lead battery is in a charged state without need for recharging.

2. The lead battery in accordance with claim 1, wherein the height $Y_0$ of said positive and negative electrode plates and the distance $Y_1$ from the bottom of said positive and negative electrode plates to the level of said electrolyte satisfy the relation:

$30 \leq Y_1/Y_0 \times 100 \leq 50$.

3. The lead battery in accordance with claim 1, wherein said electrolyte contains a sulfate of alkali metal or alkaline earth metal.

4. The lead battery in accordance with claim 1, wherein said separators comprise polyethylene.

5. The lead battery in accordance with claim 4, wherein said separators contain oil.

6. The lead battery in accordance with claim 5, wherein each of said separators contains 10 to 30% by weight of said oil.

7. The lead battery in accordance with claim 4, wherein said separators are shaped like a bag and accommodate said negative electrode plates.

8. The lead battery in accordance with claim 1, wherein said positive electrode grid has a lead alloy layer at least at a part of the surface thereof, said lead alloy layer containing at least one of Sb and Sn.

9. The lead battery in accordance with claim 1, wherein a gas inside said battery container is replaced with an inert gas.

* * * * *